(12) United States Patent
Imagaki et al.

(10) Patent No.: US 7,523,805 B2
(45) Date of Patent: Apr. 28, 2009

(54) ELECTRIC POWER STEERING APPARATUS

(75) Inventors: Susumu Imagaki, Tondabayashi (JP); Shingo Ougita, Nara (JP); Tomonori Sugiura, Kashiwara (JP)

(73) Assignee: JTEKT Corporation, Osaka (JP)

( * ) Notice: Subject to any disclaimer, the term of this patent is extended or adjusted under 35 U.S.C. 154(b) by 158 days.

(21) Appl. No.: 11/674,320

(22) Filed: Feb. 13, 2007

(65) Prior Publication Data
US 2007/0205039 A1      Sep. 6, 2007

(30) Foreign Application Priority Data
Feb. 14, 2006   (JP)   ............... 2006-036871

(51) Int. Cl.
*B62D 5/04* (2006.01)
(52) U.S. Cl. ..................... 180/444; 180/443
(58) Field of Classification Search ........... 180/443, 180/444
See application file for complete search history.

(56) References Cited

U.S. PATENT DOCUMENTS

| | | | | |
|---|---|---|---|---|
| 6,761,244 | B2* | 7/2004 | Sano et al. .............. | 180/444 |
| 6,769,507 | B2* | 8/2004 | Murakami et al. .......... | 180/444 |
| 7,188,700 | B2* | 3/2007 | Eda et al. ................ | 180/444 |
| 7,360,467 | B2* | 4/2008 | Segawa et al. ............ | 74/425 |
| 2002/0053249 | A1* | 5/2002 | Jammer et al. ............ | 74/425 |
| 2003/0146039 | A1* | 8/2003 | Sano et al. .............. | 180/444 |
| 2006/0169528 | A1* | 8/2006 | Yuasa et al. ............. | 180/444 |
| 2007/0102228 | A1* | 5/2007 | Shiina et al. ............ | 180/444 |
| 2007/0251758 | A1* | 11/2007 | Segawa et al. ............ | 180/444 |

FOREIGN PATENT DOCUMENTS

| | | |
|---|---|---|
| EP | 1452419 A | 9/2004 |
| EP | 1637769 | 3/2006 |
| JP | 2001-233224 A | 8/2001 |
| JP | 2001233225 | 8/2001 |
| JP | 2003301890 | 10/2003 |
| JP | 2004-203154 A | 7/2004 |

OTHER PUBLICATIONS

Reciprocating Seal Catalog, DM-6, p. 4, Bal Seal Engineering Company, Inc.

* cited by examiner

*Primary Examiner*—Paul N Dickson
*Assistant Examiner*—Tashiana Adams
(74) *Attorney, Agent, or Firm*—Darby & Darby P.C.

(57) ABSTRACT

An electric power steering apparatus includes a worm interlockedly connected to an output shaft of an electric motor, a first and a second bearing each supporting the respective side of the worm in a housing, and a gear wheel meshed with the worm. The housing includes a fitting bore in which the first bearing supporting a side of the worm closer to the electric motor is to be fitted, and an annular retaining portion located at a position corresponding to the second bearing and eccentrically oriented with respect to the center (axial center) of the fitting bore in a direction that shortens a distance L between the center of rotation of the worm and that of the gear wheel, and the annular retaining portion retains a coil spring around an outer circumference of the second bearing.

7 Claims, 8 Drawing Sheets

F I G. 6
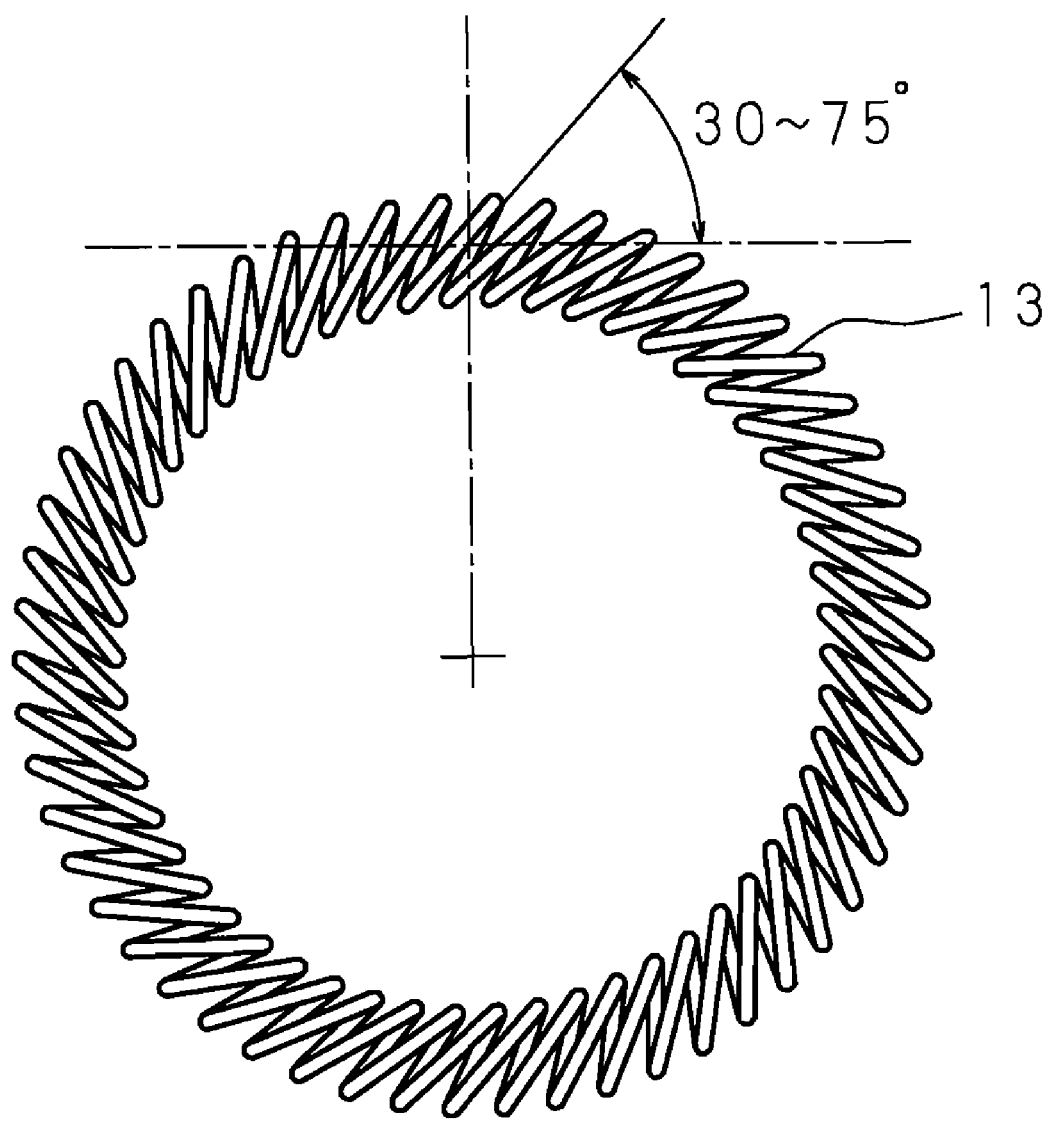

ELECTRIC POWER STEERING APPARATUS

CROSS-REFERENCE OF RELATED APPLICATION

This Nonprovisional Application claims priority under 35 U.S.C. §119(a) on Patent Application No. 2006-036871 in Japan on Feb. 14, 2006, the entire contents of which are hereby incorporated by reference.

BACKGROUND OF THE INVENTION

The present invention relates to an electric power steering apparatus that employs an electric motor as a generating source of steering assistance force.

An electric power steering apparatus for a vehicle includes an electric motor for steering assistance and a reduction gear mechanism that transmits rotational force of the electric motor to a steering unit, so as to assist the motion of the steering unit with the rotation of the electric motor in response to rotation of a steering means, thereby alleviating the labor imposed on the driver for the steering operation.

The reduction gear mechanism is supported by a pair of bearings each provided on a respective side thereof in a housing, and includes a worm serving as a pinion that moves interlocked with the rotation of the electric motor, and a worm wheel serving as a gear wheel meshed with the worm.

The electric power steering apparatuses including such reduction gear mechanism include, as disclosed in Japanese Patent Application Laid-Open No. 2004-203154 for example, the one provided with a bent leaf spring, longer than the circumference of the bearing on the farther side from the motor and having an end portion warped radially of the bearing thus to be formed generally in an á-shape, so as to be fitted around the bearing inside the housing, so that the elastic restoring force of the end portion of the bent leaf spring biases the worm in a direction that shortens a distance between the center of rotation of the worm and the center of rotation of the worm wheel, to thereby reduce an amount of backlash at the meshing interface between the worm and the worm wheel and to thus minimize rattling noise due to the backlash caused when changing the steering direction.

The electric power steering apparatus can also be found in Japanese Patent Application Laid-Open No. 2001-233224. FIGS. 1A to 1C are diagrams for explaining an assembly process of the worm according to Japanese Patent Application Laid-Open No. 2001-233224. The electric power steering apparatus includes a retaining cylinder 105 having a retaining bore 104 concentric with a bearing 103 closer to an electric motor fitted inside the housing 100 and around a bearing 102 located opposite to the bearing 103 across a worm 101. Inside the retaining bore 104 in the retaining cylinder 105, a coil spring 106 is wound such that the axial center thereof forms a ring-shape, and retained concentrically with the retaining bore 104 (Ref. FIG. 1A), so that, when assembling a worm wheel 107, the meshing interface between the worm wheel 107 and the worm 101 biases the worm 101 shown in FIG. 1B in a direction that extends the distance between the centers of rotation (L), i.e. the direction indicated by an arrow Y in FIG. 1C, to thereby slightly warp a circumferential portion of the coil spring 106 between an inner and an outer circumferential surface thereof, so that the elastic restoring force of the coil spring 106 biases the worm 101 in a direction that shortens the distance between the centers of rotation L (Ref. FIG. 1C), thus minimizing the backlash amount at the meshing interface.

BRIEF SUMMARY OF THE INVENTION

In the electric power steering apparatus that includes the generally α-shaped bent leaf spring for reducing the backlash amount as proposed in Japanese Patent Application Laid-Open No. 2004-203154, however, the bent leaf spring is prone to be accidentally deformed in the assembly process, because of its á-shaped form made of a strip-shaped leaf spring. Furthermore, the bent leaf spring requires the worker's attention on the orientation thereof so as not to assemble the bent leaf spring in a reverse orientation, because the bent leaf spring has to be assembled in a specifically predetermined orientation. Thus, the work efficiency in the assembly process has to be improved.

Also, in the electric power steering apparatus that includes the coil spring 106 for reducing the backlash amount as proposed in Japanese Patent Application Laid-Open No. 2001-233224, the worm 101 and the worm wheel 107 are meshed with each other, with the worm 101 biased in the direction that extends the distance between the centers of rotation with respect to a line connecting the center of the bearing 103 supporting the side of the worm 101 closer to the motor and the center of the coil spring 106 located opposite to the bearing 103 across the worm 101 (Ref. FIG. 1C), i.e. with the worm 101 inclined. Accordingly, the worm 101 rotates inclined with respect to the axial center of an output shaft 108 of the electric motor, and furthermore the worm 101 is biased, when meshed with the worm wheel 107, in the direction that extends the distance between the centers of rotation L with respect to a line connecting the center of the bearing 103 supporting the side of the worm 101 closer to the motor and the center of the coil spring 106 located opposite to the bearing 103 across the worm 101. For such reasons the elastic restoring force of the coil spring 106 is applied to the worm 101 in a direction orthogonal to the lengthwise direction of the distance between the centers of rotation L, which often causes a positional shift in meshing interface between the worm 101 and the worm wheel 107, thus presenting another issue to overcome.

The present invention has been achieved in view of the foregoing situation, with a primary object to provide an electric power steering apparatus that employs a coil spring, and allows increasing rotating performance of a pinion and minimizing meshing shift of the pinion with respect to the mating gear wheel.

A first aspect of the present invention provides an electric power steering apparatus comprising a pinion interlockedly connected to an output shaft of an electric motor, a first and a second bearing each supporting a respective side of the pinion in a housing, and a gear wheel meshed with the pinion and connected to a steering unit so that rotation of the electric motor assists steering operation, wherein the housing includes a fitting bore in which the first bearing supporting a side of the pinion closer to the electric motor is to be fitted, and an annular retaining portion located at a position corresponding to the second bearing and eccentrically oriented with respect to a center of the fitting bore in a direction that shortens a distance between a center of rotation of the pinion and that of the gear wheel, and the annular retaining portion retains a coil spring wound such that an axial center thereof forms a ring-shape around an outer circumference of the second bearing.

In the electric power steering apparatus according to a second aspect of the present invention, the annular retaining portion is a groove that accommodates an outer circumferential portion of the coil spring.

In the electric power steering apparatus according to a third aspect of the present invention, the housing includes two curved recessed portions that allow biasing the second bearing in a direction that extends the distance between the centers of rotation and in a direction that shortens the same, with respect to the center of the fitting bore.

According to the first aspect of the present invention, the annular retaining portion eccentrically oriented in a direction that shortens the distance between the center of rotation of the pinion and that of the gear wheel retains the coil spring, so as to locate the pinion closer to the axial center of an output shaft of the electric motor when the pinion and the gear wheel are meshed with each other. Such configuration can keep the pinion from eccentrically rotating, and also allows applying the elastic restoring force of the coil spring to the pinion on the axial center of the output shaft of the electric motor in a direction orthogonal to the direction of the distance between the centers of rotation, thereby minimizing the meshing shift of the pinion with respect to the gear wheel.

According to the second aspect of the present invention, the coil spring is fitted in the groove that is eccentrically oriented. Such arrangement allows assembling the coil spring accurately in position, thereby improving the work efficiency in the assembly process of the coil spring.

According to the third aspect of the present invention, when a reverse input load is applied from the gear wheel to the pinion, the coil spring is warped by such reverse input load so that the pinion is displaced in a direction that extends the distance between the centers of rotation, thereby mitigating the impact of the reverse input load.

The above and further objects and features of the invention will more fully be apparent from the following detailed description with accompanying drawings.

BRIEF DESCRIPTION OF THE SEVERAL VIEWS OF THE DRAWINGS

FIG. 6 is a front view showing a coil spring employed in the electric power steering apparatus according to the present invention;

DETAILED DESCRIPTION OF THE INVENTION

Figure 1A:
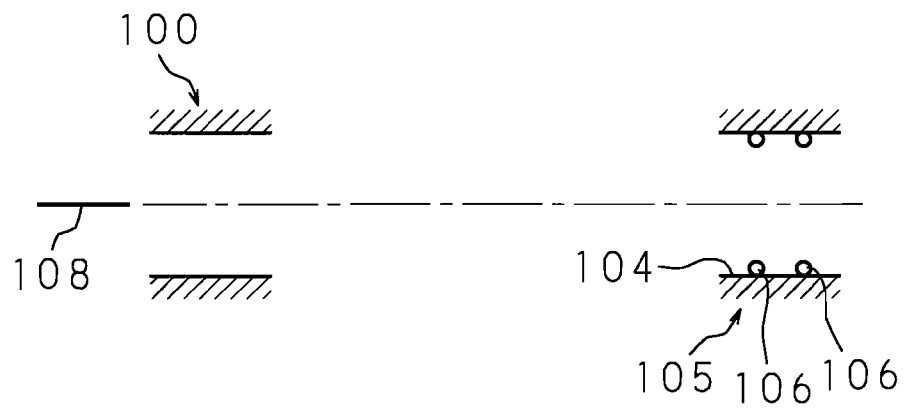
FIGS. 1A to 1C are diagrams for explaining an assembly process of the worm according to the prior art (Japanese Patent Application Laid-Open No. 2001-233224)
Figure 1B:
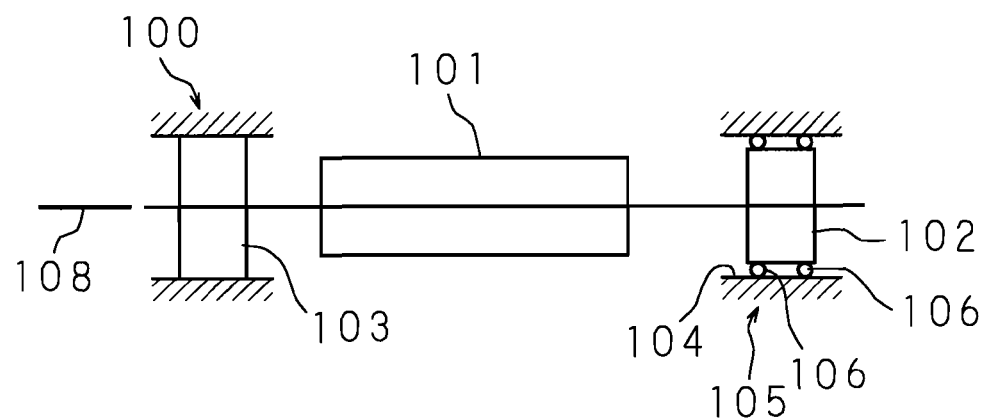
Figure 1C:
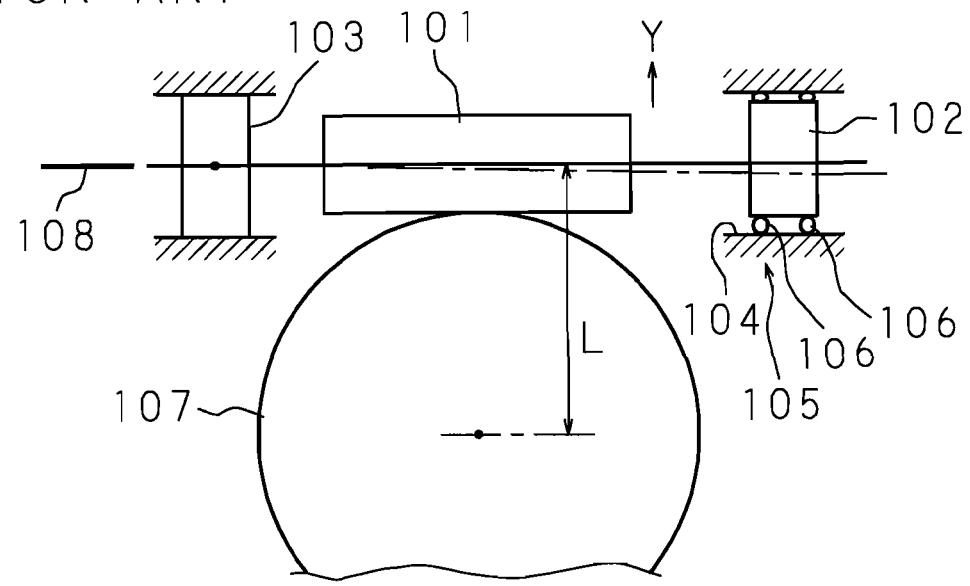
Figure 2:
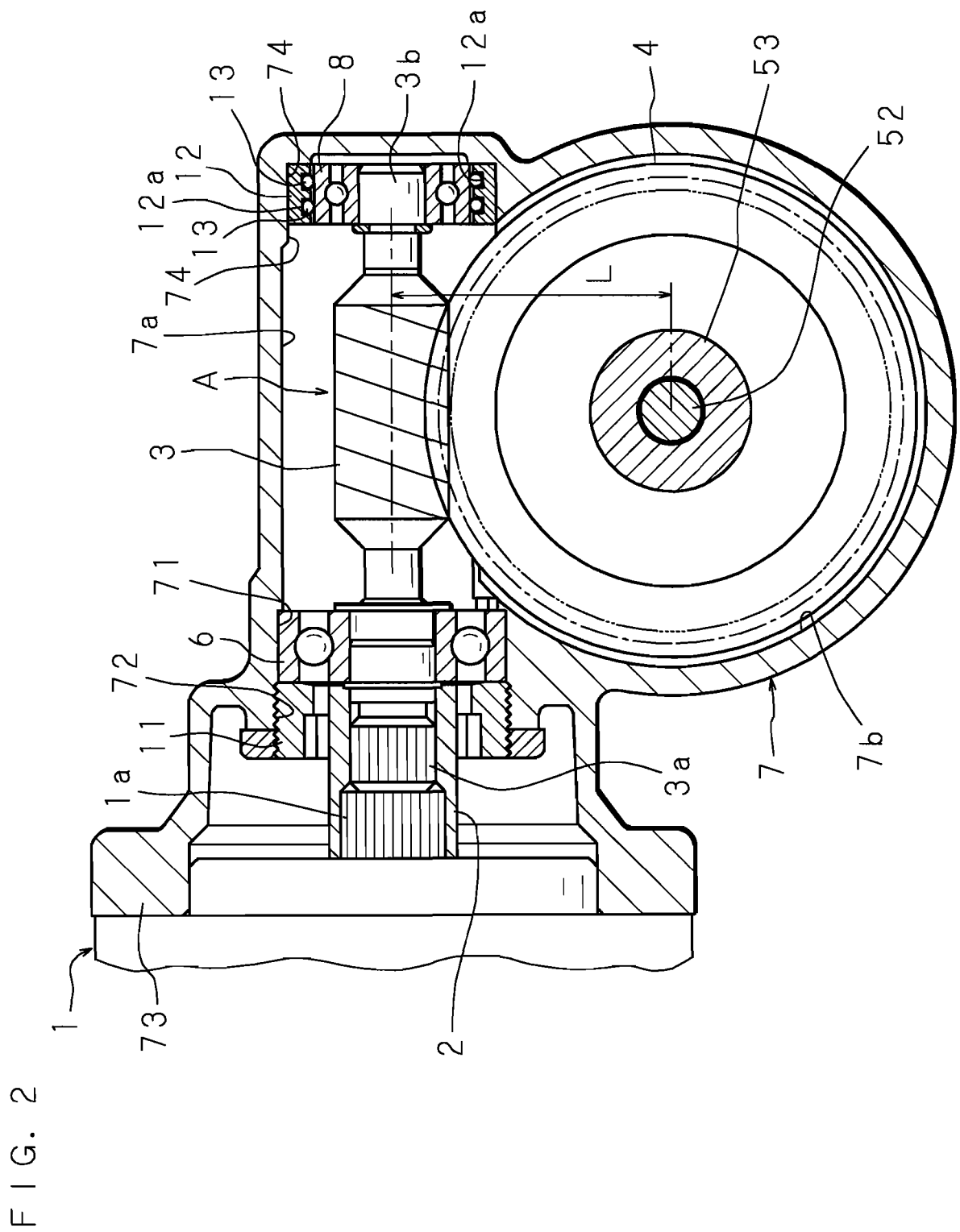
FIG. 2 is a cross-sectional view showing an important portion of an electric power steering apparatus according to the present invention.
Figure 3:
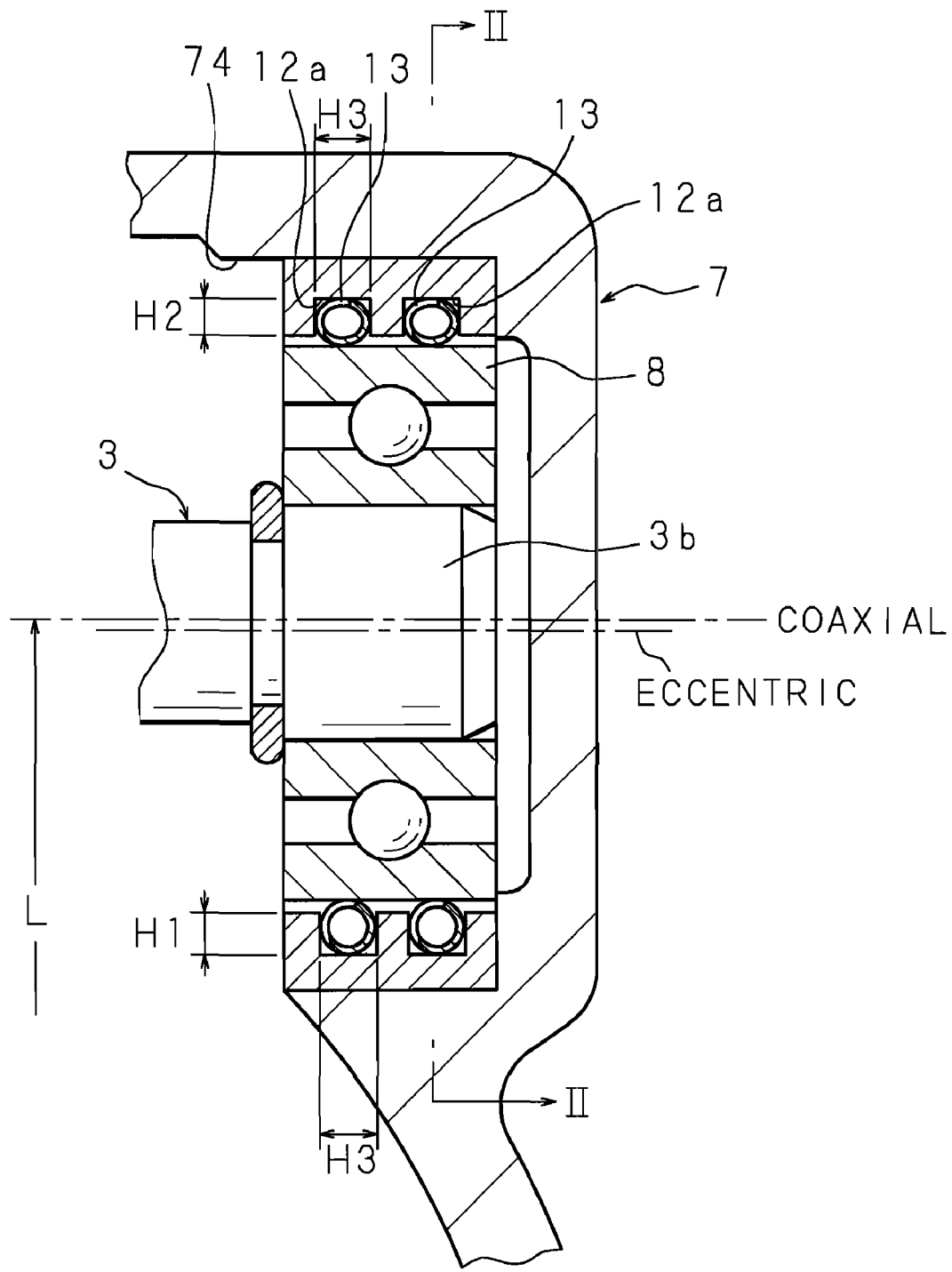
FIG. 3 is an enlarged fragmentary cross-sectional view showing the electric power steering apparatus according to the present invention.
Figure 4:
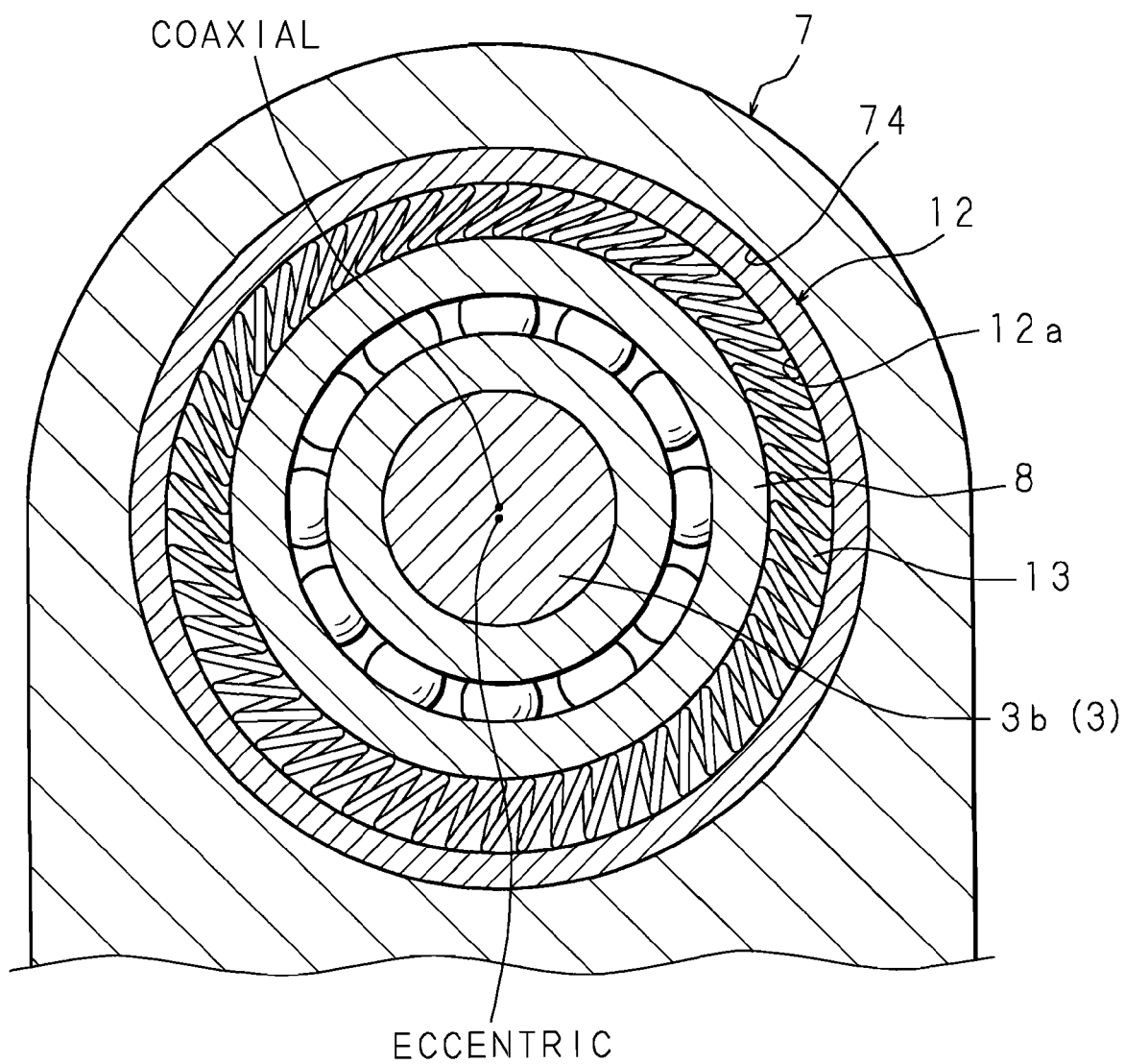
FIG. 4 is a cross-sectional view taken along the line II-II in FIG. 3.
Figure 5:
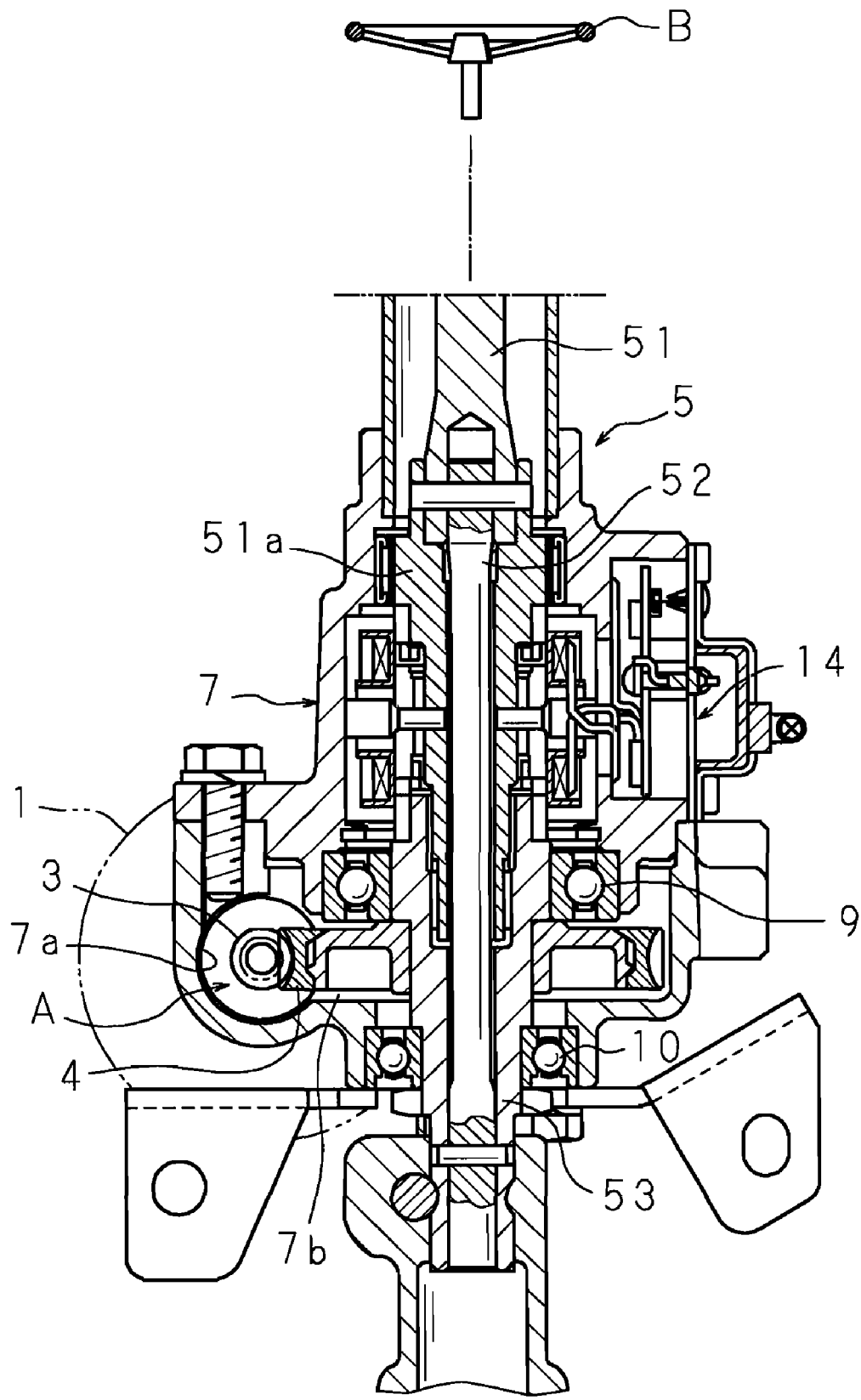
FIG. 5 is a cross-sectional view showing an overall configuration of the electric power steering apparatus according to the present invention.

Hereunder, the present invention will be described in detail based on the drawings illustrating an embodiment thereof. FIG. 2 is a cross-sectional view showing an important portion of an electric power steering apparatus according to the present invention; FIG. 3 is an enlarged fragmentary cross-sectional view of the same; FIG. 4 is a cross-sectional view taken along the line II-II in FIG. 3; and FIG. 5 is a cross-sectional view showing an overall configuration of the electric power steering apparatus.

The electric power steering apparatus includes an electric motor 1 for steering assistance, a reduction gear mechanism A including a worm 3 connected to an output shaft 1a of the electric motor 1 via a shaft coupling 2 so as to serve as a pinion and a worm wheel 4 meshed with the worm 3 to serve as a gear wheel, and a steering unit 5 connected to the reduction gear mechanism A.

The steering unit 5 includes a first steering shaft 51 having an upper end portion connected to a steering wheel B to be manipulated for the steering purpose, and a cylindrical portion 51a at a lower end portion, a torsion bar 52 inserted in the cylindrical portion 51a with its upper end portion connected to the cylindrical portion 51a of the first steering shaft 51 so as to be distorted by a steering torque applied to the steering wheel B, and a second steering shaft 53 connected to the reduction gear mechanism A with its lower end portion connected to the lower end portion of the torsion bar 52, and the second steering shaft 53 is connected, for example, to a rack-and-pinion type steering mechanism (not shown) via a universal joint.

The worm 3 of the reduction gear mechanism A includes a shaft portion 3a, 3b on the respective end portion, such that a shaft portion 3a of one end is rotatably supported by a first rolling bearing 6 in a housing 7 made of aluminum and interlockedly connected to the output shaft 1a of the electric motor 1 via the shaft coupling 2, and the other shaft portion 3b is supported by a second rolling bearing 8 in the housing 7. Here, the shaft portions 3a, 3b are press-fitted in the inner race of the rolling bearings 6, 8.

The worm wheel 4 includes an annular teeth body made of a synthetic resin and a core member made of a metal joined to an inner portion of the annular teeth body, and the core member is fixedly fitted to a position halfway of the second steering shaft 53.

The housing 7 includes a first chamber 7a that accommodates the worm 3 and rotatably supports the shaft portions 3a, 3b of the worm 3 via the rolling bearings 6, 8, and a second chamber 7b that accommodates the worm wheel 4, and supports the worm wheel 4 via a pair of rolling bearings 9, 10 fitted to the second steering shaft 53.

The first chamber 7a extends along an axial direction of the worm 3, and includes, in a lengthwise end portion thereof, a fitting bore 71 supporting the first rolling bearing 6 fitted therein, a threaded bore 72 extending from the fitting bore 71, and a motor mounting base 73 respectively, and a ring screw 11 that contacts the outer race of the first rolling bearing 6 thus to delimit the axial motion thereof is screw-engaged with the threaded bore 72. Also, to the motor mounting base 73 the electric motor 1 is attached.

The fitting bore 71 is concentric with the output shaft 1a, and concentrically supports the worm 3 with the output shaft 1a via the first rolling bearing 6 fitted in the fitting bore 71. The shaft portion 3a, interlockedly connecting the worm 3 to the output shaft 1a, is serration-fitted to the shaft coupling 2. The serration-fitting portion includes a gap that permits the worm 3 to be inclined in an appropriate angle with respect to the axial center of the output shaft 1a, based on the position supported by the first rolling bearing 6.

The first chamber 7a includes in the other end portion a retaining bore 74 larger in diameter than the second rolling bearing 8, and a retaining cylinder 12 having a fitting groove 12a serving as the annular retaining portion fitted to an inner wall of the retaining bore 74. The retaining bore 74 is concentric with the fitting bore 71.

The inner and the outer circumferential surface of the retaining cylinder 12 are both concentric with the fitting bore 71 and the retaining bore 74, and two fitting grooves 12*a* are eccentrically provided with respect to the fitting bore 71 and the retaining bore 74, in a direction that shortens the distance L between the center of rotation of the worm 3 and the centers of rotation of the worm wheel 4. The fitting grooves 12*a* are aligned with a spacing in a lengthwise direction on the inner circumferential surface of the retaining cylinder 12, and respectively include an outer circumferential portion of a coil spring 13 wound such that the axial center thereof forms a ring-shape. In addition, the inner circumferential surface of the retaining cylinder 12 is larger in diameter than the outer diameter of the second rolling bearing 8.

The fitting grooves 12*a* have a greater depth H1 into the retaining bore 74 in the direction that shortens the distance between the centers of rotation L than the groove depth H2 in the direction that extends the distance between the centers of rotation L thus establishing the relationship of H1>H2. Also, the groove depth H1 is shallower than the dimension between the inner and the outer circumferential surface of the coil spring 13. Further, the groove width H3, H3 in a direction orthogonal to the direction of the distance between the centers of rotation L is generally uniform (H3 nearly equals to H3). The groove depth H1 warps the coil spring 13 to a lesser extent; the groove depth H2 warps the coil spring 13 to a greater extent; and the groove width H3, H3 barely warps the coil spring 13. The groove width is equal to or slightly greater than the dimension between the inner and the outer circumferential surface of the coil spring 13.

FIG. 6 is a front view showing a structure of the coil spring.

The coil spring 13 is constituted of a metal wire of 0.1 to 0.2 mm in diameter wound in a coil-shape, and such coil spring 13 is wound such that the axial center thereof forms a ring-shape, with the end portions connected to each other. The coil spring 13 has its outer circumferential portion retained in the fitting groove 12*a* and its inner circumferential portion disposed in contact with an outer circumferential surface of the second rolling bearing 8, and is biasing the second rolling bearing 8, with the warp between the inner circumferential portion and the outer circumferential portion, in the direction that shortens the distance between the centers of rotation L, and hence biasing the worm 3 toward the meshing interface with the worm wheel 4. A portion of the coil spring 13 corresponding to the groove depth H1 provides smaller elastic restoring force; a portion corresponding to the groove depth H2 provides greater elastic restoring force; and a portion corresponding to the groove width H3, H3 provides relatively small elastic restoring force. Also, the winding angle of the coil spring 13 is inclined by 30° to 75° with respect to the axial center, so that variation in elastic restoring force against the warp becomes relatively small in a pressurized state.

Also, the housing 7 includes a built-in torque sensor 14 that detects a steering torque applied to the steering wheel B based on a relative rotational displacement between the steering shafts 51, 53 created by the distortion of the torsion bar 52, so that the electric motor 1 is driven under control based on the torque detected by the torque sensor 14 and so on.

Figure 7A:
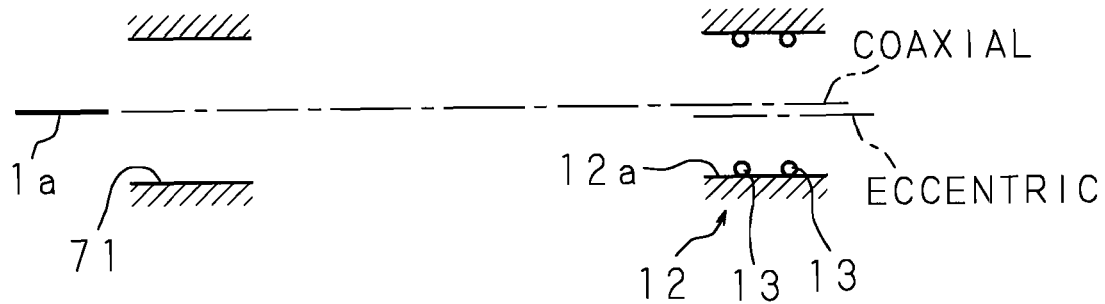
FIGS. 7A to 7C are diagrams for explaining an assembly process of an important portion of the electric power steering apparatus according to the present invention.
Figure 7B:
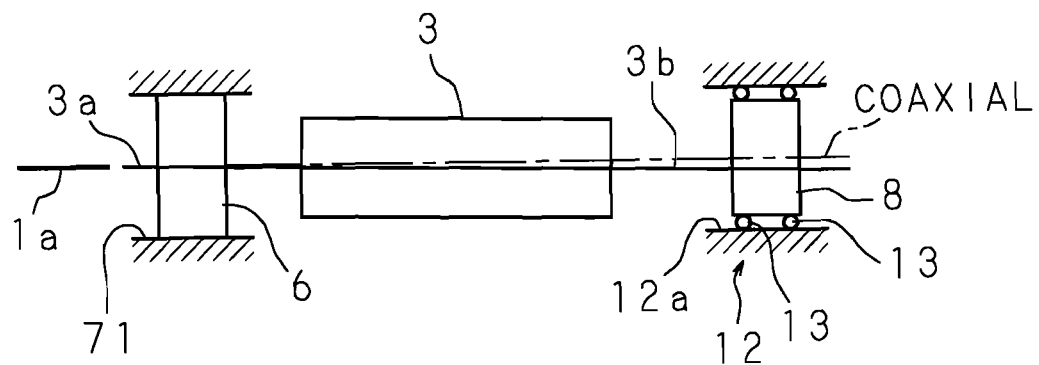
Figure 7C:
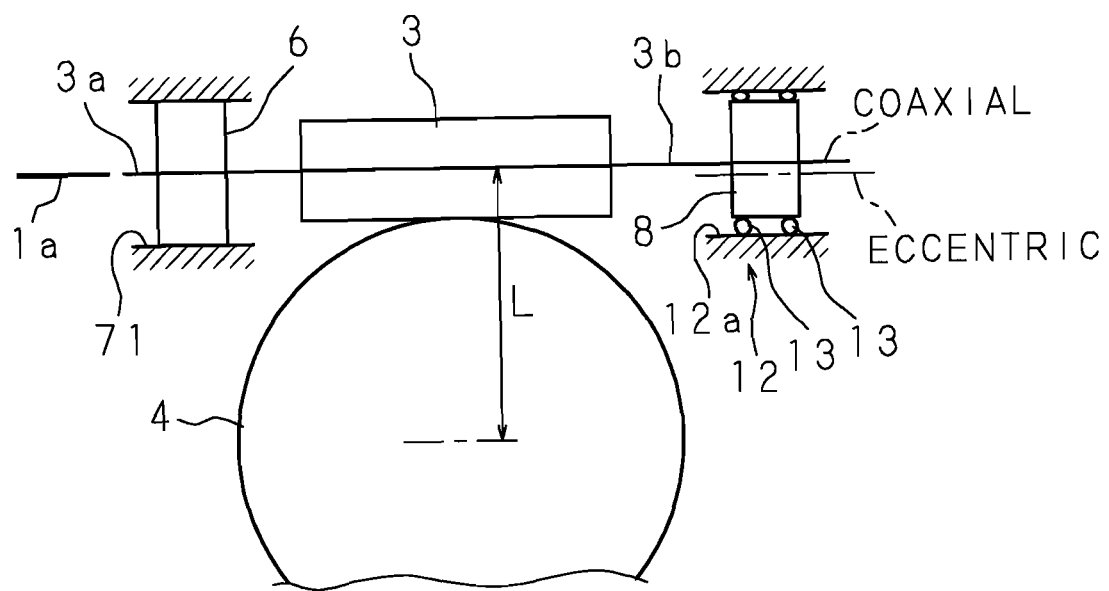

FIGS. 7A to 7C are diagrams for explaining an assembly process of an important portion of the electric power steering apparatus. When assembling the worm 3 into the electric power steering apparatus thus constructed under a state where the electric motor 1 is not yet mounted, the retaining cylinder 12 including the coil springs 13 retained in the fitting grooves 12*a* is inserted in the first chamber 7*a* from the side of the motor mounting base 73 of the housing 7, and is fitted to an inner wall of the retaining bore 74 with the coil springs 13 eccentrically oriented in the direction that shortens the distance between the centers of rotation L (Ref. FIG. 7A). Then the worm 3 with the rolling bearings 6, 8 respectively press-fitted to the shaft portions 3*a*, 3*b* is inserted in the first chamber 7*a*, and the second rolling bearing 8 is fitted in the coil spring 13 and then the first rolling bearing 6 is fitted in the fitting bore 71 (Ref. FIG. 7B), after which the ring screw 11 is screw-engaged with the threaded bore 72, thereby restricting the axial motion of the worm 3.

Thereafter, the electric motor 1 is mounted on the motor mounting base 73 of the housing 7, during which the output shaft 1*a* and the shaft portion 3*a* are interlockedly connected via the shaft coupling 2, so as to finally fix the electric motor 1 on the housing 7.

The shaft portion 3*a* of the worm 3 thus assembled is supported by the fitting bore 71 concentrically with the output shaft 1*a*, and the shaft portion 3*b* of the worm 3 is in a position that shortens the distance between the centers of rotation L, because of the coil springs 13 retained by the fitting grooves 12*a* corresponding to the annular retaining portion (Ref. FIGS. 7B and 7C). When the worm wheel 4 is then assembled in the second chamber 7*b*, the worm wheel 4 is meshed with the worm 3, so as to displace the worm 3, by warping the coil springs 13, in the direction that extends the distance between the centers of rotation L, in other words so as to concentrically dispose the worm 3 with the fitting bore 71 and the retaining bore 74 (Ref. FIG. 7C). Accordingly, the worm 3 can be biased, at a position concentric with the fitting bore 71 and the retaining bore 74, in the direction that shortens the distance between the centers of rotation L, so that the amount of backlash at the meshing interface between the worm 3 and the worm wheel 4 can be minimized, and the rotating performance of the worm 3 can be upgraded. Also, since the worm 3 is biased by the elastic restoring force of the coil spring 13 in the direction that shortens the distance between the centers of rotation L, i.e. toward the worm wheel 4, the meshing shift of the worm with respect to the worm wheel can be minimized.

Figure 8:
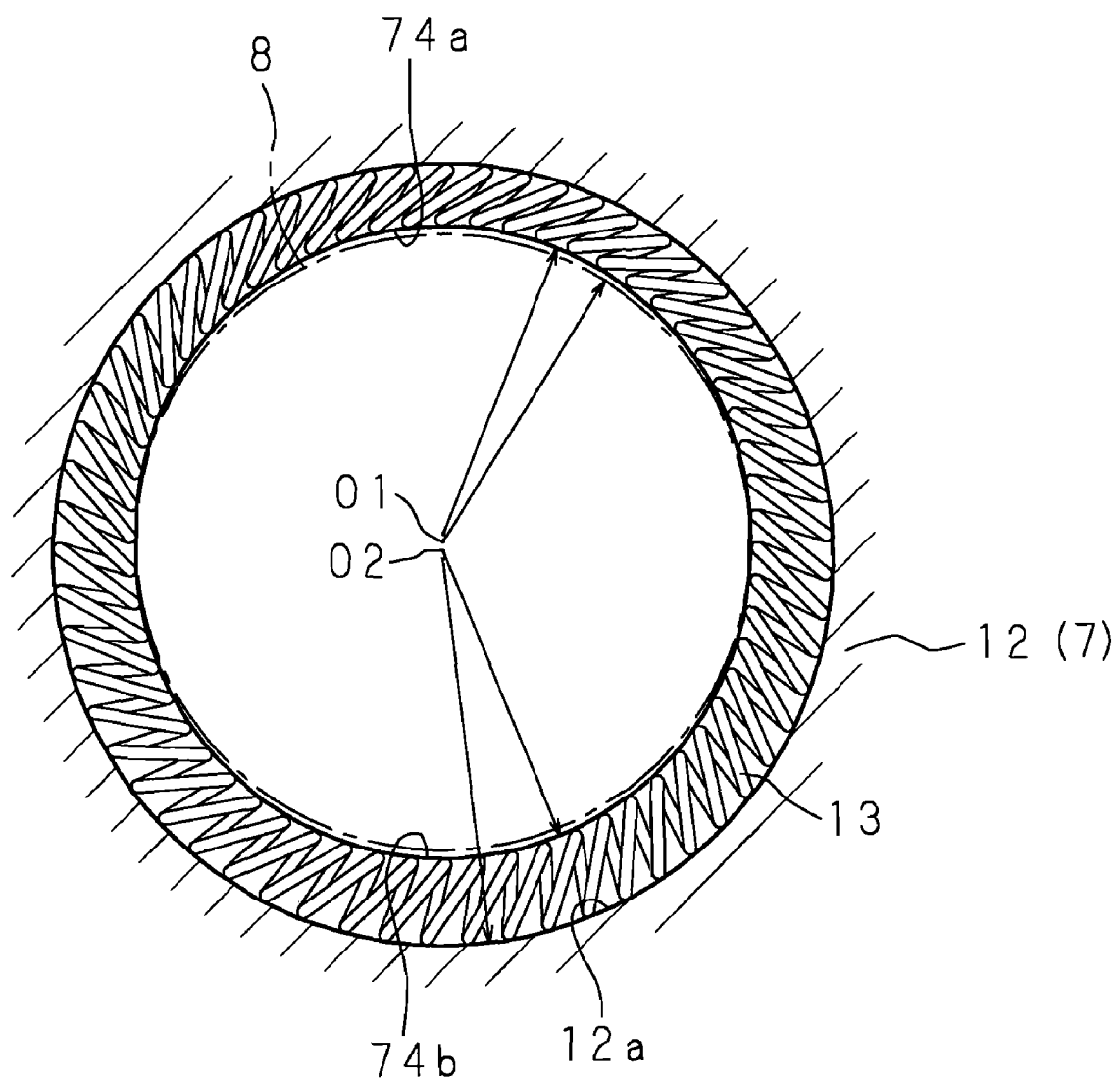
FIG. 8 is a fragmentary cross-sectional view showing another configuration of the electric power steering apparatus.

FIG. 8 is a fragmentary cross-sectional view showing another configuration of the electric power steering apparatus. In the electric power steering apparatus according to this embodiment, the retaining bore 74 of the housing 7 is formed in an elliptical shape including curved recessed portions 74*a*, 74*b* respectively having its center at an eccentric point O1 to which the distance between the centers of rotation L extends beyond the axial center of the output shaft 1*a* and the worm 3, and at an eccentric point O2 to which the distance between the centers of rotation L is shortened, in other words formed in an ellipse having a major axis in a direction that the distance between the centers of rotation L is extended and shortened.

In this embodiment, when the reverse input load is applied to the meshing interface so as to displace the worm 3 in the direction that extends the distance between the centers of rotation L with respect to the axial center of the output shaft 1*a*, the worm 3 can be restricted from being displaced in a region where the coil spring 13 exerts greater elastic restoring force because the retaining bore 74 is of an elliptical shape, and hence the second rolling bearing 8 can be prevented from being butted to the retaining bore 74 to create a rattling noise. Also, the groove depth of the fitting groove can be made shallower with respect to the amount of eccentricity of the fitting groove, which allows employing a coil spring of a smaller diameter, thus reducing the cost.

The structure and effects of the remaining portions are the same as those of the embodiment illustrated in FIGS. 1 through 6C, and therefore the same constituents are given the identical numerals, and detailed description thereon and the working effect thereof will not be repeated.

Although the retaining cylinder 12 having the fitting grooves 12a is fitted in the housing 7 so as to retain the coil springs 13 in the fitting grooves 12a of the retaining cylinder 12 in the foregoing embodiments, the retaining cylinder 12 may be omitted and the fitting grooves 12a may be provided on the retaining bore 74 of the housing 7, so as to retain the coil springs 13 in such fitting grooves 12a. Also, just one fitting groove 12a may be provided, instead of two.

Although the coil spring 13 has the end portions connected to each other thus to form a ring-shape, the coil spring may be disposed such that the axial center generally forms a C-shape in the fitting groove 12a, without connecting the end portions. Also, either a plurality of coil springs 13 or just one may be provided.

Further, the reduction mechanism A according to the foregoing embodiments may be a hypoid gear including a hypoid pinion serving as the pinion and a hypoid wheel serving as the gear wheel, without limitation to the worm gear including the worm 3 serving as the pinion and the worm wheel 4 serving as the gear wheel.

As this invention may be embodied in several forms without departing from the spirit of essential characteristics thereof, the present embodiments are therefore illustrative and not restrictive, since the scope of the invention is defined by the appended claims rather than by description preceding them, and all changes that fall within metes and bounds of the claims, or equivalence of such metes and bounds thereof are therefore intended to be embraced by the claims.

What is claimed is:

1. An electric power steering apparatus which transmits rotation of an output shaft of an electric motor in a housing to a steering shaft, thereby assisting steering operation, comprising:
   a pinion interlockedly connected to the output shaft;
   a first and a second bearing each supporting the pinion at a respective end of a pinion axis in the housing, each of the first and second bearing having an inner diameter and an outer diameter; and
   a gear wheel meshed with the pinion and concentrically fitted to the steering shaft,
   wherein the housing includes:
   a fitting bore in which the first bearing supporting one side of the pinion proximal to the electric motor is to be fitted; and
   a ring having an inner diameter larger than the outer diameter of the second bearing and provided at a position corresponding to the second bearing supporting another side of the pinion distal to the electric motor, and
   wherein the ring retains a coil spring such that a part of the coil spring is disposed on at least a part of an outer circumference of the second bearing, and a center of the coil spring is eccentrically oriented with respect to a central axis of the fitting bore toward a central axis of rotation of the gear wheel.

2. The electric power steering apparatus according to claim 1, wherein the ring includes a groove which accommodates an outer circumferential portion of the coil spring.

3. The electric power steering apparatus according to claim 1, wherein the housing includes a recessed portion in which at least a part of the bearing is fitted, to thereby allow the second bearing to be displaced closer to or away from a central axis of gear wheel rotation, with respect to a central axis of the fitting bore.

4. The electric power steering apparatus according to claim 1, wherein the coil spring has both end portions connected to each other, and is retained in the groove such that the coiling center line of the coil spring forms a ring-shape around the outer circumference of the second bearing.

5. The electric power steering apparatus according to claim 1, wherein the coil spring is retained in the groove such that the coiling center line of the coil spring is disposed around the outer circumference of the second bearing, and forms a C-shape.

6. The electric power steering apparatus according to claim 2, wherein a plurality of the grooves is provided in the ring.

7. The electric power steering apparatus according to claim 2, wherein the groove is deeper in a radial direction in a region closer to a central axis of gear wheel rotation with respect to a central axis of the fitting bore, than in a region more distant from the central axis of the gear wheel rotation with respect to the central axis of the fitting bore.

* * * * *